(12) United States Patent
Stergioudis

(10) Patent No.: US 12,118,437 B2
(45) Date of Patent: Oct. 15, 2024

(54) ACTIVE LEARNING VIA A SURROGATE MACHINE LEARNING MODEL USING KNOWLEDGE DISTILLATION

(71) Applicant: Citrix Systems, Inc., Fort Lauderdale, FL (US)

(72) Inventor: Asterios Stergioudis, Poligiros (GR)

(*) Notice: Subject to any disclaimer, the term of this patent is extended or adjusted under 35 U.S.C. 154(b) by 899 days.

(21) Appl. No.: 17/188,167

(22) Filed: Mar. 1, 2021

(65) Prior Publication Data

US 2022/0230095 A1    Jul. 21, 2022

Related U.S. Application Data

(63) Continuation of application No. PCT/GR2021/000005, filed on Jan. 21, 2021.

(51) Int. Cl.
  *G10L 15/06*     (2013.01)
  *G06N 5/043*    (2023.01)
  *G06N 20/00*   (2019.01)

(52) U.S. Cl.
  CPC ............. *G06N 20/00* (2019.01); *G06N 5/043* (2013.01); *G10L 15/063* (2013.01)

(58) Field of Classification Search
  CPC ....... G06N 20/00; G06N 5/043; G10L 15/063
  See application file for complete search history.

(56) References Cited

U.S. PATENT DOCUMENTS

| 8,825,570 B2 * | 9/2014 | Forman ................. G06N 20/00 706/12 |
| 10,296,848 B1 | 5/2019 | Mars et al. |
| 10,452,782 B1 * | 10/2019 | Kumar ................. G06F 40/295 |
| 11,321,629 B1 * | 5/2022 | Rowan ................. G06N 20/00 |
| 2018/0173403 A1 * | 6/2018 | Carbune ................ G06Q 50/12 |
| 2020/0302924 A1 * | 9/2020 | Andreica ................ G10L 15/02 |
| 2020/0394511 A1 | 12/2020 | Kasai et al. |
| 2021/0012194 A1 | 1/2021 | Laskaridis et al. |
| 2021/0328949 A1 * | 10/2021 | Yim ...................... G06Q 10/103 |
| 2022/0270597 A1 * | 8/2022 | Qiu ......................... G10L 15/22 |
| 2022/0351720 A1 * | 11/2022 | Alon ....................... G06F 3/167 |

OTHER PUBLICATIONS

International Search Report and Written Opinion on PCT Appl. No. PCT/GR2021/000005 mailed Oct. 19, 2021.

* cited by examiner

*Primary Examiner* — Beau D Spratt

(57) ABSTRACT

Systems and methods of training a model is provided. The system can identify an unlabeled data set with phrases received by a virtual assistant that interfaces with one or more virtual applications to execute one or more functions. The system can query the unlabeled data set to select a first set of phrases based at least on one or more confidence scores output by a surrogate model that corresponds to a third-party model maintained by a third-party system. The system can receive, via a user interface, indications of functions to be executed by the one or more virtual applications responsive to the selected first set of phrases. The system can provide, to the third-party system, the indications of functions for the selected first set of phrases to train the third-party model and configure the virtual assistant to execute a function responsive to a phrase in the first set of phrases.

18 Claims, 7 Drawing Sheets

ACTIVE LEARNING VIA A SURROGATE MACHINE LEARNING MODEL USING KNOWLEDGE DISTILLATION

CROSS-REFERENCE TO RELATED APPLICATION

This application is a continuation of and claims priority to and the benefit of International Patent Application No. PCT/GR2021/000005, titled "ACTIVE LEARNING VIA A SURROGATE MACHINE LEARNING MODEL USING KNOWLEDGE DISTILLATION," and filed on Jan. 21, 2021, the contents of all of which are hereby incorporated herein by reference in its entirety for all purposes.

BACKGROUND

In network environments, a server can host or provide access to a plurality of resources or applications for a plurality of users. The server can provide one or more functions, while leveraging one or more third-party systems to perform certain functions.

SUMMARY

This technical solution is directed towards systems and methods of active learning via a surrogate machine learning model using knowledge distillation. In an illustrative example, systems and methods of this technical solution can train a model for a virtual assistant that interfaces with one or more virtual applications hosted on one or more servers. Training a machine learning model, engine, or function can be challenging due to the lack of training data or the resource-intensive nature of creating accurate and reliable training data. Without sufficient training data, the machine learning model may provide poor predictions, resulting in the performance of erroneous functions by the virtual assistant, for example. Thus, systems and methods of this technical solution can improve a machine learning model with active learning via surrogate machine learning model using knowledge distillation.

To improve active learning by efficiently selecting data samples from the unlabeled pool of data, this technical solution can generate a surrogate model. The surrogate model can be a surrogate, proxy or student model of the third-party model. The surrogate model can output additional information relative to the third-party model. For example, the third-party model may provide a single output, whereas the surrogate model can provide multiple candidate outputs along with confidence scores for each candidate output. The system can leverage the confidence scores from the surrogate model to select data samples from the unlabeled pool of data to improve the training data set in an efficient manner.

At least one aspect is directed to a method of training a model for a virtual assistant that interfaces with one or more virtual applications hosted on one or more servers. The method can include one or more processors identifying an unlabeled data set. The unlabeled data set can include a plurality of phrases received by a virtual assistant that interfaces with one or more virtual applications to execute one or more functions. The method can include the one or more processors querying the unlabeled data set to select a first set of phrases from the plurality of phrases. The method can include the one or more processors selecting the first set of phrases based at least on one or more confidence scores output by a surrogate model that corresponds to a third-party model maintained by a third-party system. The method can include the one or more processors receiving, via a user interface, indications of functions to be executed by the one or more virtual applications responsive to the selected first set of phrases. The method can include the one or more processors providing, to the third-party system, the indications of functions for the selected first set of phrases to train the third-party model and configure the virtual assistant to execute a function responsive to a phrase in the first set of phrases.

In some implementations, the method can include the one or more processors providing a labeled data set to the third-party system to train the third-party model. The labeled data set can include phrases configured for input into the virtual assistant and indications of corresponding functions to be executed by the one or more virtual applications.

The method can include the one or more processors training the surrogate model with a labeled data set. The labeled data set can include phrases configured for input into the virtual assistant and indications of corresponding functions to be executed by the one or more virtual applications. The method can include the one or more processors inputting the unlabeled data set into the surrogate model trained with the labeled data set to generate the predictions for the unlabeled data set.

The method can include the one or more processors constructing a query to select the first set of phrases based on at least one of an uncertainty sampling technique or a query-by-committee technique. The method can include the one or more processors providing the first set of phrases selected from the plurality of phrases in the unlabeled data set to the third-party system. The method can include the one or more processors receiving soft targets for the first of phrases output by the third-party model. The soft targets can include predictions for functions responsive to the first set of phrases. In some implementations, the method can include the one or more processors adjusting the soft targets using a smoothing technique. The smoothing technique can include at least one of probability clipping, a probability assignment, or a softmax temperature. The method can include the one or more processors training the surrogate model based on the adjusted soft targets and the indications of functions received via the user interface.

The method can include the one or more processors providing, responsive to the selection of the first set of phrases, a prompt via the user interface for the indications of functions responsive to the first set of phrases. The method can include the one or more processors determining a level of performance of the virtual assistant in causing the one or more virtual applications to execute the one or more functions responsive to input phrases. The method can include the one or more processors selecting, responsive to the level of performance being less than or equal to a threshold, a second set of phrases from the plurality of phrases in the unlabeled data set to receive second indications of functions for provision to the third-party system to train the third-party model.

The method can include the one or more processors determining a change in the level of performance of the virtual assistant in causing the one or more virtual applications to execute the one or more functions responsive to input phrases. The method can include the one or more processors preventing, responsive to the change in the level of performance being less than or equal to a second threshold, selection of a subsequent set of phrases from the unlabeled data set to complete a labeling process for the unlabeled data set.

At least one aspect is directed to a system to train a model for a virtual assistant that interfaces with one or more virtual applications hosted on one or more servers. The system can include memory and one or more processors. The one or more processors can identify an unlabeled data set comprising a plurality of phrases received by a virtual assistant that interfaces with one or more virtual applications to execute one or more functions. The one or more processors can query the unlabeled data set to select a first set of phrases from the plurality of phrases based at least on one or more confidence scores output by a surrogate model that corresponds to a third-party model maintained by a third-party system. The one or more processors can receive, via a user interface, indications of functions to be executed by the one or more virtual applications responsive to the selected first set of phrases. The one or more processors can provide, to the third-party system, the indications of functions for the selected first set of phrases to train the third-party model and configure the virtual assistant to execute a function responsive to a phrase in the first set of phrases.

In some implementations, the one or more processors can provide a labeled data set to the third-party system to train the third-party model. The labeled data set can include phrases configured for input into the virtual assistant and indications of corresponding functions to be executed by the one or more virtual applications.

The one or more processors can train the surrogate model with a labeled data set. The labeled data set comprising phrases configured for input into the virtual assistant and indications of corresponding functions to be executed by the one or more virtual applications. The one or more processors can input the unlabeled data set into the surrogate model trained with the labeled data set to generate the predictions for the unlabeled data set.

The one or more processors can construct a query to select the first set of phrases based on at least one of an uncertainty sampling technique or a query-by-committee technique. The one or more processors can provide the first set of phrases selected from the plurality of phrases in the unlabeled data set to the third-party system. The one or more processors can receive soft targets for the first of phrases output by the third-party model, the soft targets comprising predictions for functions responsive to the first set of phrases.

The one or more processors can adjust the soft targets using a smoothing technique including at least one of a probability clipping, a probability assignment, or a softmax temperature. The one or more processors can train the surrogate model based on the adjusted soft targets and the indications of functions received via the user interface.

The one or more processors can provide, responsive to the selection of the first set of phrases, a prompt via the user interface for the indications of functions responsive to the first set of phrases.

At least one aspect is directed to a non-transitory computer-readable medium including instructions that, when executed by one or more processors, train a model for a virtual assistant that interfaces with one or more virtual applications hosted on one or more servers. The instructions can include instructions to identify an unlabeled data set comprising a plurality of phrases received by a virtual assistant that interfaces with one or more virtual applications to execute one or more functions. The instructions can include instructions to query the unlabeled data set to select a first set of phrases from the plurality of phrases based at least on one or more confidence scores output by a surrogate model that corresponds to a third-party model maintained by a third-party system. The instructions can include instructions to receive, via a user interface, indications of functions to be executed by the one or more virtual applications responsive to the selected first set of phrases. The instructions can include instructions to provide, to the third-party system, the indications of functions for the selected first set of phrases to train the third-party model and configure the virtual assistant to execute a function responsive to a phrase in the first set of phrases.

In some implementations, the instructions can include instructions to provide a labeled data set to the third-party system to train the third-party model. The labeled data set can include phrases configured for input into the virtual assistant and indications of corresponding functions to be executed by the one or more virtual applications.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
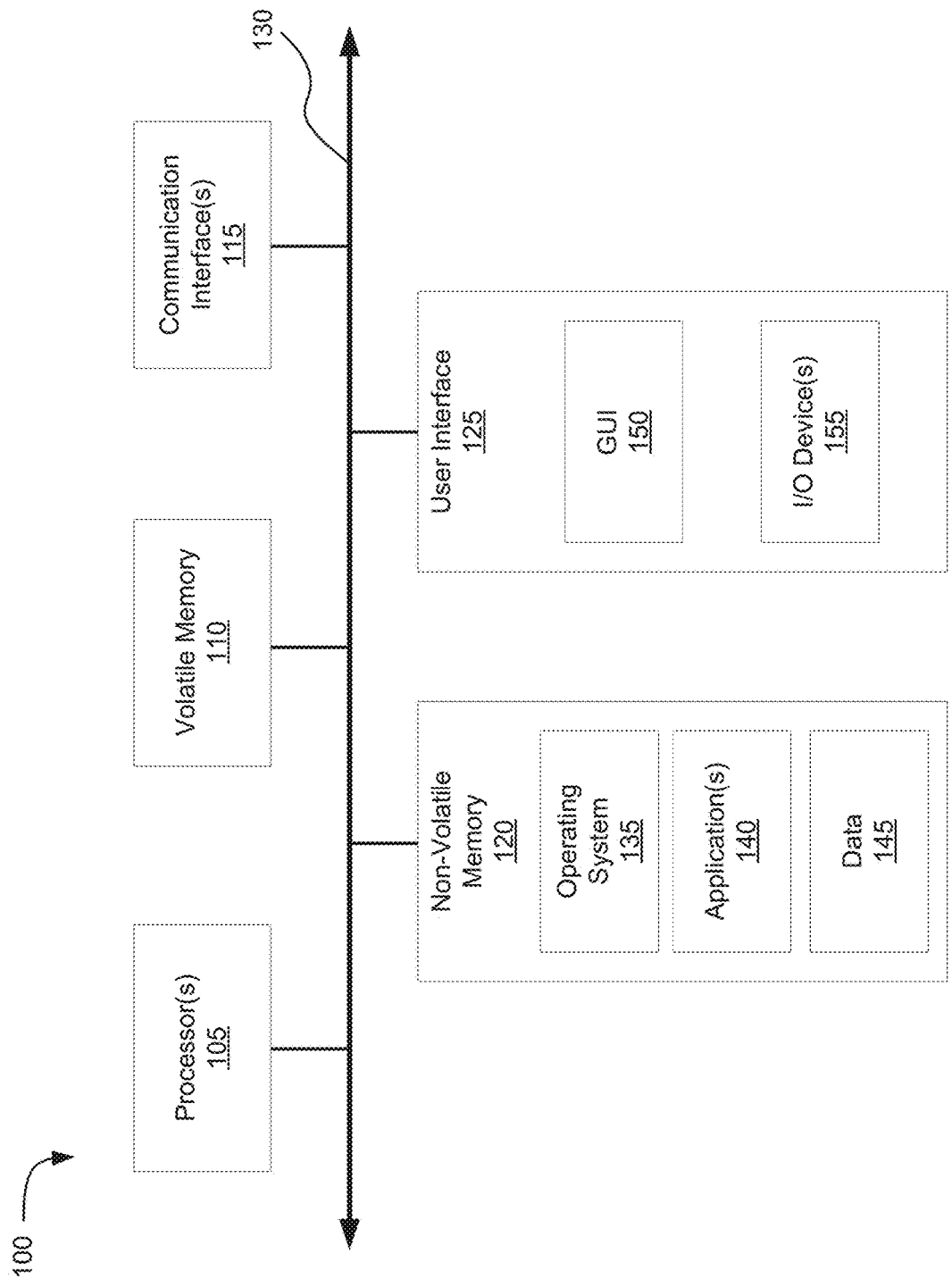
FIG. 1A is a block diagram of embodiments of a computing device.

This technical solution is directed towards systems and methods of active learning via a surrogate machine learning model using knowledge distillation. For example, systems and methods of this technical solution can train a model for a virtual assistant that interfaces with one or more virtual applications hosted on one or more servers. Training a machine learning model, engine, or function can be challenging due to manual, time-consuming and resource intensive annotation of training data. Failure to properly train a machine learning model with accurate, reliable and complete training data can result in a poorly functioning machine learning model, thereby providing erroneous, faulty, or unreliable outputs. For example, a virtual assistant that uses a natural language processing model trained via machine learning may receive a voice input to perform an action on a virtual application hosted on a server. Training the model with inaccurate or incomplete training data can prevent the virtual assistant from identifying a corresponding function or cause the virtual assistant to perform an erroneous function in the virtual application, thereby consuming excessive or wasteful computing or network bandwidth resources, as well as resulting in poor user experience. Thus, systems and methods of this technical solution can improve a machine learning model with active learning via surrogate machine learning model using knowledge distillation.

For example, active learning can include selecting data samples from an unlabeled pool of data. The system can provide the selected data samples to an oracle, such as a human, in order to get ground truth data. However, due to the large amount of data in the unlabeled pool of data, it can be challenging to efficiently select one or more data samples to present to the oracle. Furthermore, since systems can leverage a third-party machine learning model to perform certain aspects, such as a third-party natural language processor, the system facilitating the active learning or generating the training data set may not have access to particular mechanisms, functions, or intermediary outputs of the third-party machine learning model in order to facilitate efficient selection of data samples from the unlabeled pool of data.

To improve active learning by efficiently selecting data samples from the unlabeled pool of data, this technical solution can generate a surrogate model. The generated surrogate model can facilitate or allow for the improvement of active learning. The surrogate model can be a surrogate, proxy or student model of the third-party model. The surrogate model may emulate aspects of the third-party model. The surrogate model can be trained based on the third-party model. The surrogate model can learn a representation of the input data that is closer to the actual third-party model, providing improved parity between the surrogate model and the third-party model. The surrogate model can output additional information relative to the third-party model. For example, the third-party model may provide a single output, whereas the surrogate model can provide multiple candidate outputs along with confidence scores for each candidate output. The system can leverage the confidence scores from the surrogate model to select data samples from the unlabeled pool of data to present to the oracle. Upon receiving input from the oracle, the system can provide the training data set to the third-party model to improve the performance of the third-party model, thereby resulting in improve natural language processing or other machine learning task.

For purposes of reading the description of the various embodiments below, the following descriptions of the sections of the specification and their respective contents can be helpful:

Section A describes a computing environment which can be useful for practicing embodiments described herein.

Section B describes systems and methods for active learning via a surrogate machine learning model using knowledge distillation.

A. Computing Environment

Prior to discussing the specifics of embodiments of the systems and methods of for securing offline data (e.g., browser offline data) for shared accounts, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
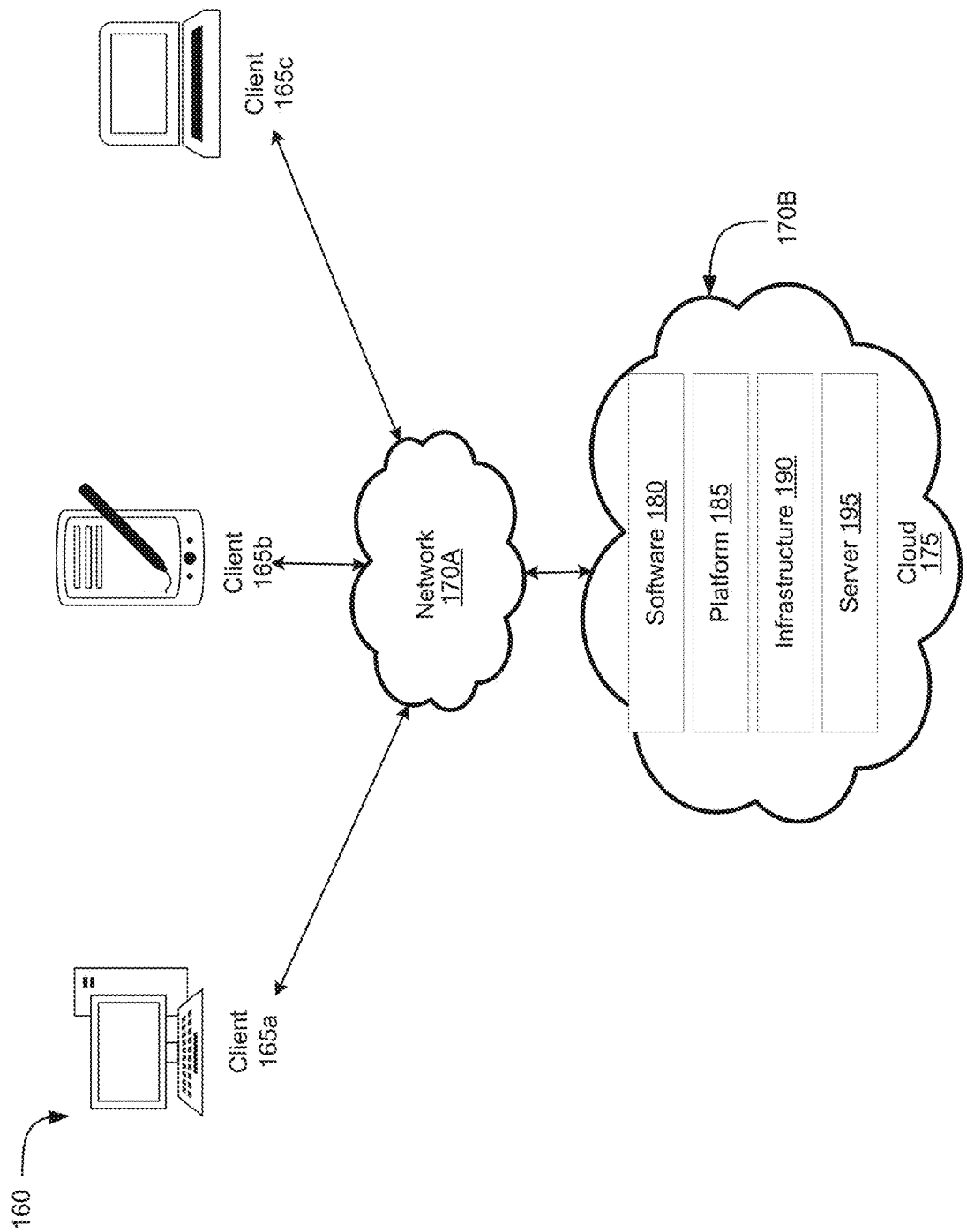
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods for Active Learning Via a Surrogate Machine Learning Model Using Knowledge Distillation Systems and methods of active learning via a surrogate machine learning model using knowledge distillation are provided. The technical solution can apply active learning to machine learning models that are maintained by 3rd-party ("3P") services, which can be challenging because 3P services do not provide information about the internal workings of their machine learning model, nor do 3P services report per-class probabilities for the inference results output by the machine learning model. To do so, this technical solution can include: a) training a surrogate model side-by-side with the 3rd-party model, which can then be used to employ the unlabeled sample querying strategies of active learning; and b) applying knowledge distillation to improve the performance of the surrogate model in approximating the behavior of the 3rd-party model, which can result in further optimizing active learning performance. Thus, this technical solution can improve learning performance of a function that utilizes a machine learning model trained with a training data set by providing faster active learning than randomly selecting unlabeled samples. As systems increasingly leverage black-box machine learning models provided by third-parties, which increases the resource intensive task of feeding the models with labeled data, this technical solution can improve the performance of the machine learning model while reducing the resources utilized in generating and providing the training data for the machine learning model.

Indeed, machine learning ("ML") systems can rely on having a dataset with annotated data samples. Annotated data samples can refer to data samples where the respective class (in case of classification problem) or value (in case of regression problem) is known. The performance of the ML system can be based on having a large pool of accurately annotated data. The ML system can perform various tasks, such as a virtual assistant, autonomous driving functionality, prediction, object detection, or any other task or function that can leverage artificial intelligence or a ML system.

It can be challenging to obtain labelled data to train the ML system. In some cases, the training data can be manually annotated. For example, a virtual assistant can use a natural language understanding model. In order for the virtual assistant to understand what the user is asking, the training data can be manually labeled where each data sample includes of a training phrase (e.g. "Show me my open JIRA tickets") and the respective label (e.g. "ServiceDesk-.Lookup"). This labeling task can be resource intensive because the annotator may require expertise and it can take a significant amount of time, since a large number of labels are required to provide a high quality training data set. Even though there may be an abundance of unlabeled data, it can be challenging or inefficient to label the unlabeled data. For example, the virtual assistant may receive a large pool of unlabeled data from real users. However, it is challenging and resource intensive to annotate this data with labels in order to use the data to train a machine learning model.

Active learning can refer to a case of machine learning in which a learning function is configured to interactively query a user (e.g., oracle or some other information source) to obtain the desired outputs (e.g., the labels) of new data points. The system can proactively select the subset of available examples to be labeled next from a pool of unlabeled instances. By proactively selecting the subset of available examples to be labeled, the ML function can achieve a better accuracy while using fewer training labels, thereby allowing the ML model to perform better faster while preventing an oracle from having to decide which data samples to annotate in which order.

However, due to increasing use of ML models maintained by 3P services, it can be challenging to proactively select data samples to label. Entities are increasingly using 3P ML models because ML infrastructure can be challenging to develop and maintain and 3P ML providers may have access to large scale computing infrastructure, advanced ML techniques, and expertise, such as in manufacturing, natural language understanding, or computer vision. Further, 3P ML providers may have access to large data sets and computational resources that can be used to train or pre-train ML models.

Despite the benefits of using 3rd party ML models, their usage comes with some disadvantages. For example, the end-user of the 3P ML service may not have any control on the model itself and on what type of output the model produces. The inability to control the output produce by the 3P model can result in the 3P model outputting limited information. For example, the output of the 3P model can be limited to the predicted class plus a confidence of this prediction. The confidence score, which may or may not even be provided by the 3P, may not be calibrated for various reasons, such as a desire by the 3P to hide information behind the techniques used by the 3P.

In the event the output of these 3rd party ML models is limited and the end-user's control over the output is also limited, it may not be possible for a system to utilize an active learning technique that leverages a querying strategy to proactively select data samples from an unlabeled pool of data. For example, query-by-committee ("QBC") techniques may not function without multiple models outputting predictions; margin sampling and entropy sampling techniques may not function because they utilize probabilities of more than one class; and a least confident approach may not function because it utilizes a confidence score, and the confidence score output by a 3P model may not be accurate since the outputted confidence score may be a fixed value, such as 100%.

Thus, it can be challenging or not possible to effectively utilize active learning by proactively selecting data samples from an unlabeled data pool when a 3P ML model is leveraged by a system. This technical solution, by generating a surrogate machine learning model using knowledge distillation, can leverage active learning techniques even in cases were the output of the 3rd party ML model is limited.

Figure 2:
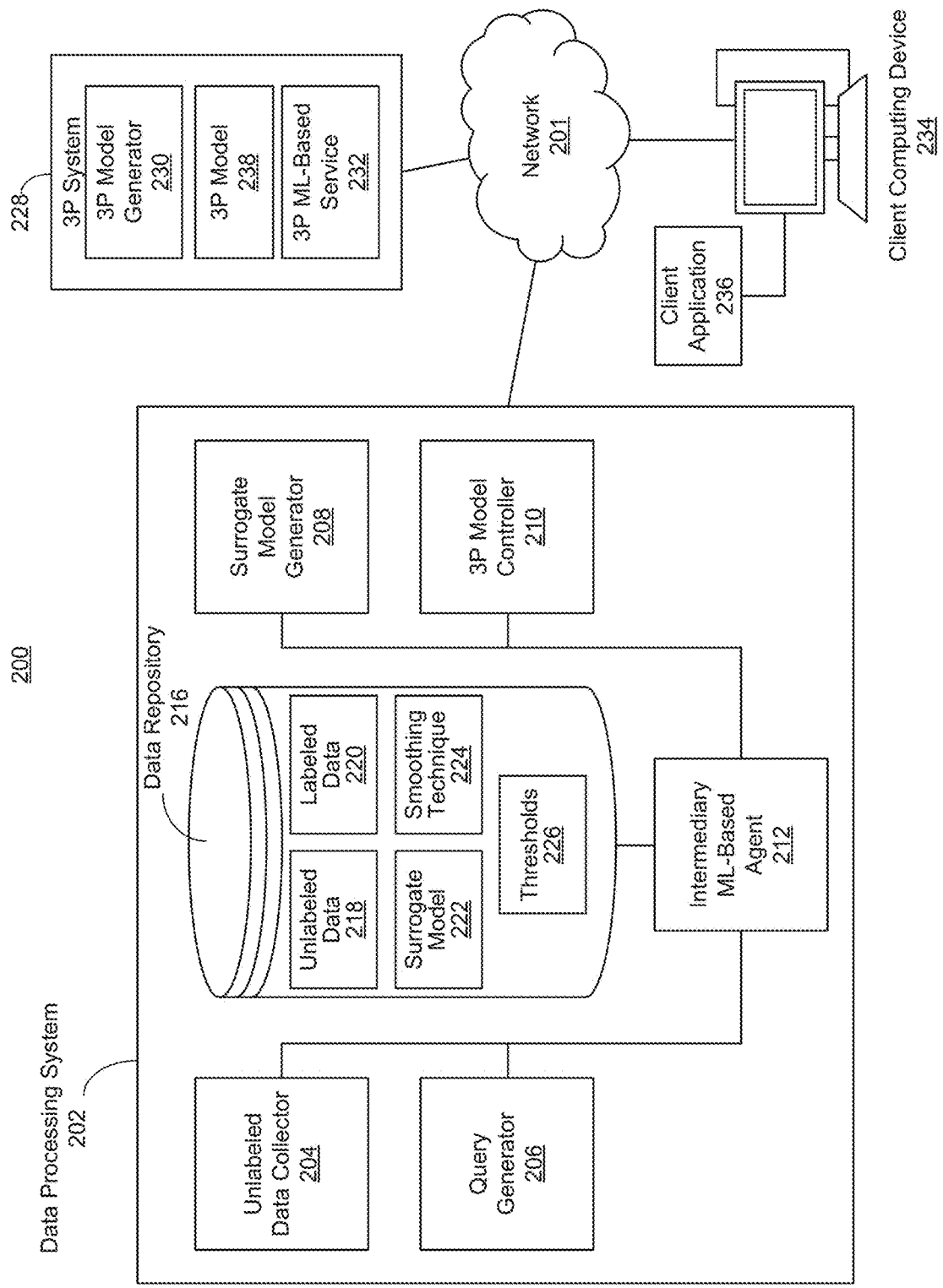
FIG. 2 is a block diagram of a system for training a model, in accordance with an implementation.

Referring to FIG. 2, depicted is a block diagram of a system for training a model, in accordance with an implementation. The system 200 can include a data processing system 202 that can interface or communicate with a client computing device 234 via a network 201. Network 201 can include one more component or functionality of network 170A or 170B, for example. The data processing system 202 can include one or more servers, such as servers 195, or be part of the cloud 175. The data processing system 202 can interface or communicate with a 3P system 228 via network 201. The 3P system 228 can include one or more servers 195, be part of the cloud 175, or include a component or functionality of client 165a-c. The client computing device 234 can include one or more component or functionality of client device 165a-c depicted in FIG. 1B. The 3P system 228 can include or refer to a vendor, provider, or administrator of a 3P ML-based service 232 that uses a 3P model 238 generated or maintained by a 3P model generator 230. The 3P ML-based service can refer to a machine learning engine, or artificial intelligence-based service or function. For example, the 3P ML-based service can provide a natural language processing service, voice-based digital assistant, virtual assistant, autonomous driving function, image recognition service, or object detection service, ML-based manufacturing service. The 3P model generator 230 can train a 3P model 238 using one or more machine learning techniques.

The data processing system 202 can provide a virtual computing environment. The data processing system can provide one or more virtual applications. The virtual computing environment can host a virtual application. A virtual application or virtual computing environment can refer to an application or operating system hosted by the data processing system 202 that is accessed by a client computing device 234 via a client application 236. For example, the data processing system 202 can receive a request from the client application 236 to establish a session for a virtual desktop or virtual application, and then invoke or launch the virtual desktop or virtual application. The client application 236 can include a web browser, embedded web browser, or other application.

The data processing system 202 can include an unlabeled data collector 204 that can receive, obtain, collect or otherwise identify unlabeled data samples. The data processing system 202 can include a query generator 206 that can query a pool of unlabeled data to select one or more samples for active learning. The data processing system 202 can include a surrogate model generator 208 that can generate a surrogate model that can emulate at least a portion of a 3P model generator 230 or 3P model. The data processing system 202 can include a 3P model controller 210 that can communicate or interface with the 3P system 228 to provide training data, provide data samples, or receive outputs from the 3P model 238. The data processing system 202 can include an intermediary ML-based agent 212 to perform one or more ML-based task or function, or interface with the 3P ML-based service 232 to perform the ML-based task, function, or service. The data processing system 202 can include a data repository 216 that stores or maintains unlabeled data 218, labeled data 220, one or more models 222, one or more smoothing techniques 224, or threshold 226.

The unlabeled data collector 204, query generator 206, surrogate model generator 208, 3P model controller 210, intermediary ML-based agent 212, 3P model generator 230, 3P model 238, 3P ML-based service 232, or client application 236 can each include at least one processing unit or other logic device such as programmable logic array engine, or module configured to communicate with one or more other system or component depicted in FIG. 1. The unlabeled data collector 204, query generator 206, surrogate model generator 208, 3P model controller 210, or intermediary ML-based agent 212 can be separate components, a single component, or part of the server 430. The system 100 and its components can include hardware elements, such as one or more processors, logic devices, or circuits.

The data processing system 202, client computing device 234 or 3P system 228 can include or be implemented using hardware or a combination of software and hardware. For example, components of the data processing system 202, client computing device 234 or 3P system 228 can include logical circuitry (e.g., a central processing unit or CPU) that responses to and processes instructions fetched from a memory unit. Components of the data processing system 202, client computing device 234 or 3P system 228 can include or use a microprocessor or a multi-core processor. A multi-core processor can include two or more processing units on a single computing component. Components of the data processing system 202, client computing device 234 or 3P system 228 can be based on any of these processors, or any other processor capable of operating as described herein. Processors can utilize instruction level parallelism, thread level parallelism, different levels of cache, etc. For example, the data processing system 202, client computing device 234 or 3P system 228 can include at least one logic device such as a computing device or server having at least one processor 105. The components and elements of the data processing system 202, client computing device 234 or 3P system 228 can be separate components or a single component. The data processing system 202, client computing device 234 or 3P system 228 can include a memory component, a random access memory (RAM) or other dynamic storage device, a storage device for storing information, and instructions to be executed. The memory can include at least one read only memory (ROM) or other static storage device coupled with the storage device for storing static information and instructions. The memory can include a storage device, such as a solid state device, magnetic disk or optical disk, to persistently store information and instructions.

The system 200 can include, access, communicate with, or otherwise interface with a client computing device 234 that executes or provides a client application 236. The client computing device 234, via client application 236, can establish a session with or in a virtual computing environment provided by the data processing system 202. The session can refer to a session to access web or SaaS delivered application from the data processing system 202, 3P system 228, or web servers. The client computing device 234 can include one or more client applications 236, such as a web browser or agent, configured to establish a session with the virtual computing environment to access one or more virtual applications provided via the data processing system 202.

The client application 236 can include one or more components, such as an embedded browser, a networking agent, a cloud services agent (e.g., a management agent), a remote session agent (e.g., a High-Definition User Experience "HDX" engine), and/or a secure container, e.g., a secure cache container). One or more of the components can be installed as part of a software build or release of the client application 236, or separately acquired or downloaded and installed/integrated into an existing installation of the client application 236 for instance. The client computing device 234 can download or otherwise receive the client application 236 (or any component) from the data processing system 202. In some implementations, the client computing device 234 can send a request for the client application 236 to the data processing system 202. For example, a user of the client computing device 234 can initiate a request, download and/or installation of the client application 236. The data processing system 202 in turn can send the client application 236 to the client computing device 234. In some implementations, the data processing system 202 can send a setup or installation application for the client application 236 to the client computing device 234. Upon receipt, the client computing device 234 can install the client application 236 onto a hard disk of the client computing device 234. The client computing device 234 can run the setup application to unpack or decompress a package of the client application 236. The client application 236 can be an extension (e.g., an add-on, an add-in, an applet or a plug-in) to another application (e.g., a cloud services agent) installed on the client computing device 234. The client computing device 234 can install the client application 236 to interface or inter-operate with the pre-installed application. In some cases, the client application 236 can be a standalone application. The client computing device 234 can install the client application 236 to execute as a separate process.

The client application 236 can include elements and functionalities of a web browser application or engine. The client application 236 can locally render virtual applications as a component or extension of the client application 236. For instance, the client application 236 can render a SaaS/Web application inside the client application 236 which can provide the client application 236 with full visibility and control of the application session. The embedded browser can be embedded or incorporated into the client application 236 via any means, such as direct integration (e.g., programming language or script insertion) into the executable code of the client application, or via plugin installation. For example, the embedded browser can include a Chromium based browser engine or other type of browser engine, that can be embedded into the client application, using the Chromium embedded framework (CEF) for instance. The embedded browser can include a HTML5-based layout graphical user interface (GUI). The embedded browser can provide HTML rendering and JavaScript support to a client application incorporating various programming languages. For example, elements of the embedded browser can bind to a client application incorporating C, C++, Delphi, Go, Java, .NET/Mono, Visual Basic 6.0, and/or Python.

In some implementations, the client application 236 (e.g., embedded browser comprises) a plug-in installed on the client application 236. For example, the plug-in can include one or more components. One such component can be an ActiveX control or Java control or any other type and/or form of executable instructions capable of loading into and executing in the client application. For example, the client application 236 can load and run an Active X control of the embedded browser, such as in a memory space or context of the client application. In some implementations, the embedded browser can be installed as an extension on the client application 236, and a user can choose to enable or disable the plugin or extension. The embedded browser (e.g., via the plugin or extension) can form or operate as a secured browser for securing, using and/or accessing resources within the secured portion of the digital workspace.

The embedded browser can incorporate code and functionalities beyond that available or possible in a standard or typical browser. For instance, the embedded browser can bind with or be assigned with a secured container, to define at least part of the secured portion of a user's digital workspace. The embedded browser can bind with or be assigned with a portion of the client computing device's 234 cache to form a secured clipboard (e.g., local to the client computing device 234, or extendable to other devices), that can be at least part of the secured container. The embedded browser can be integrated with the client application 236 to ensure that traffic related to network applications is routed through and/or processed in the client application, which can provide the client application with real-time visibility to the traffic (e.g., when decrypted through the client application). This visibility to the traffic can allow the client application 236 to perform or facilitate policy-based management (e.g., including data loss prevention (DLP) capabilities), application control, and collection and production of analytics.

In some embodiments, the client application 236 can interoperate with the data processing system 202 to access a virtual application. For example, the client application 236 can receive and transmit navigation commands from a user to a virtual application hosted in the virtual computing environment provided via the data processing system 202. The client application 236 can use a remote presentation protocol to display the output generated by the virtual application. For example, the client application 236 can include a HTML5 web client that allows end users to access remote virtual applications or virtual computing environments via the client application 236.

In some cases, the client computing device 234 (e.g., via client application 236) can transmit voice commands or voice input. The client computing device 234 can include a microphone to detect, record, or otherwise sense voice input from a user of the client computing device 234. In some cases, the client computing device 234 can receive text input from the user, such as natural language-based text input. The client computing device 234 can transmit the voice input or text input to the data processing system 202, such as the intermediary ML-based agent 212, to perform. The voice input or text input from the user can include a request to perform a task, function or service associated with a virtual application. However, to determine the task or function to perform, the data processing system 202 can perform natural language processing or leverage a 3P system to perform natural language processing to parse the user input and determine the function to perform on a virtual application in response to the user input. The virtual application can be from an a 3P application vendor, such as a provider or vendor of the enterprise (e.g., salesforce.com, SAP, Microsoft Office 365, Google's Dialogflow, Facebook's wit.ai, Microsoft's bot framework, Amazon's Lex, IBM's Watson Assistant), from the enterprise itself, or from another entity (e.g., Dropbox or Gmail service).

The client application 236 can establish a session with the virtual computing environment or to a virtual application. The session can support a remoting protocol (e.g., HDX or ICA). The session can include a remote desktop session and/or remote application session using any variety of protocols, such as the Remote Desktop Protocol (RDP), Appliance Link Protocol (ALP), Remote Frame Buffer (RFB) Protocol, and ICA Protocol. The session can be for a user of the client computing device 234 to access a virtual application. The client application 236 can establish the session within or over a secure connection (e.g., a VPN).

The data processing system 202 or other server can provide or host the virtual computing environment (e.g., a virtual desktop) or virtual applications. By way of a non-limiting example, virtual applications can include network applications from Workday, Salesforce, Office 365, SAP, etc. Example virtual applications can include word processing applications, presentation applications, messaging applications, software development applications, spreadsheet applications, etc. A user instance of a client application 236, that is installed on client computing device 234, can register or authenticate with the data processing system 202 or virtual computing environment. For example, the user can authenticate the user to the client computing device 234 and login to the client computing device 234. The client application 236 can automatically execute, or be activated by the user. In some embodiments, the user can sign in to the client application 236 (e.g., by authenticating the user to the client application 236). In response to the login or sign-in, the client application can register or authenticate the user and/or the client application with the virtual computing environment.

The user can initiate connection to a virtual application (e.g., a SaaS application), by selecting from the list of network applications presented to the user. For example, the user can click on an icon or other representation of the virtual application, displayed via the client application 236. This user action can trigger the client application 236 to transmit a connection or access request to a server that provisions the virtual application. The request can include a request to the data processing system 202, the 3P system 228 server, or other SaaS provider to authenticate the user and establish a session.

The 3P system 228 can be provided, managed or otherwise maintained by any third-party entity, organization or company. The 3P system 228 can provide one or more task or function based on a machine learning technique. The 3P system 228 can interface with the data processing system 202 via an interface, such as an application programming interface. The 3P system 228 can include a 3P model generator 230 designed, constructed and operational to generate a 3P model 238. The 3P model generator 230 can receive training data from a data processing system 202 or other source, and train the 3P model 238 using one or more machine learning technique. For example, the 3P model generator 230 can train the 3P model 238 using one or more of neural networks, decision trees, support vector machines, regression analysis, or Bayesian networks. A neural network can refer to or include a model based on a collection of connected units or nodes that can be based on the neurons in a biological brain. Example neural networks can include convolution neural network, long short-term memory; or generative adversarial networks. Decision tree learning can utilize a predictive model to go from observations about an item to conclusions about the item's target value. The decision tree model can include classification trees or regression trees. A support vector machine can refer to a supervised learning model configured to analyze data for classification or regression analysis. For example, given a set of training examples that are marked as belonging to one of two categories, a support-vector machine can build a model that assigns new examples to one category or the other. Regression analysis can include a set of statistical processes for estimating relationships between dependent variables (e.g., outcome variable) and one or more independent variables (e.g., predictors, covariates, or features). Bayesian network can refer to a probabilistic graphical model that can represent a set of variables and their conditional dependencies via a direct acyclic graph. A genetic function can refer to a metaheuristic based on the process of natural selection. Thus, the 3P model generator 230 can be configured with any type of machine learning technique or artificial intelligence technique.

The 3P model generator 230 can train a 3P model 238 based on received training data. The 3P model generator 230 can maintain the 3P model 238 by updating or re-training the 3P model 238 based on subsequently received data or feedback data. The 3P model generator 230 can store the 3P model 238 in a database or other data repository accessible to the 3P system 228.

In some cases, the 3P system 228 can include a 3P ML-based service 232. The 3P ML-based service 232 can perform a function, task or provide a service based on or using the 3P model 238 trained by the 3P model generator 230. The 3P ML-based service 232 can include, for example, a virtual assistant, autonomous driving functionality, natural language understanding, conversational dialogue generator, computer vision, object detection, etc. In some cases, the 3P ML-based service 232 can interface with an intermediary ML-based agent 212 of the data processing system 202 to perform a task or function. For example, the client computing device 234 can receive voice input from a user of the client computing device 234. The voice input can include a hotword, wakeup word or other trigger keyword. The client computing device 234 can transmit the voice input to the data processing system 202 or intermediary ml-based agent 212 for processing. The intermediary ML-based agent 212 can forward the voice input to the 3P ML-based service 232 for natural language processing. The ML-based service 232 can transmit the output or a command back to the intermediary ML-based agent 212 to perform a function. The function can include, for example, performing a task via a virtual application accessible via the client application 236. In some cases, the client application 236 can be configured to forward the voice input to the 3P ML-based service 232.

The data processing system 202 can include an unlabeled data collector 204 designed, constructed and operational to collect unlabeled data. The unlabeled data collector 204 can obtain data samples from one or more sources, and store the unlabeled data in an unlabeled data structure 218 stored in data repository 216. The unlabeled data samples can refer to data samples that have not yet been annotated or labeled by an oracle. An oracle can refer to a human or user that can provide an annotation or label to a data sample. The oracle can provide ground truth for the data samples. For example, the data sample can be a phrase. The label can be a function to perform that is responsive to a request in the phrase. In another example, the data sample can be an image of an object, and the annotation or label can be a name corresponding to the object—such as a desk or lamp.

The unlabeled data collector 204 can receive data samples from the client application 236. For example, the data samples can be voice or text input by a user of the client computing device 234 in order to perform a function or task associated with an ML-based service, such as a virtual assistant performing a function via a virtual application. The unlabeled data collector 204 can receive the input from the user, determine it includes a request to perform an ML-based function, and store the input as a data sample in the unlabeled data structure 218. The unlabeled data collector 204 can aggregated data samples from multiple client computing devices 234 or users, and store the unlabeled data samples in unlabeled data structure 218. The unlabeled data structure 218 can include phrases received from one or more users that include requests to execute one or more functions via one or more virtual applications.

The unlabeled data collector 204 can perform pre-processing on the data prior to storing the data in the unlabeled data structure 218. For example, the unlabeled data collector 204 can identify data samples that satisfy a condition prior to storing the data samples in the unlabeled data structure 218. The condition can include an audio quality, syntax of text input, type of request, or trigger keyword present in the data sample.

In some cases, the unlabeled data collector 204 can receive a voice or text input to determine whether it matches a data sample in the labeled data structure 220. If the received data sample matches a data sample in the labeled data structure 220, then the unlabeled data collector 204 can determine to not store the data sample in the unlabeled data structure 218.

Figure 3:
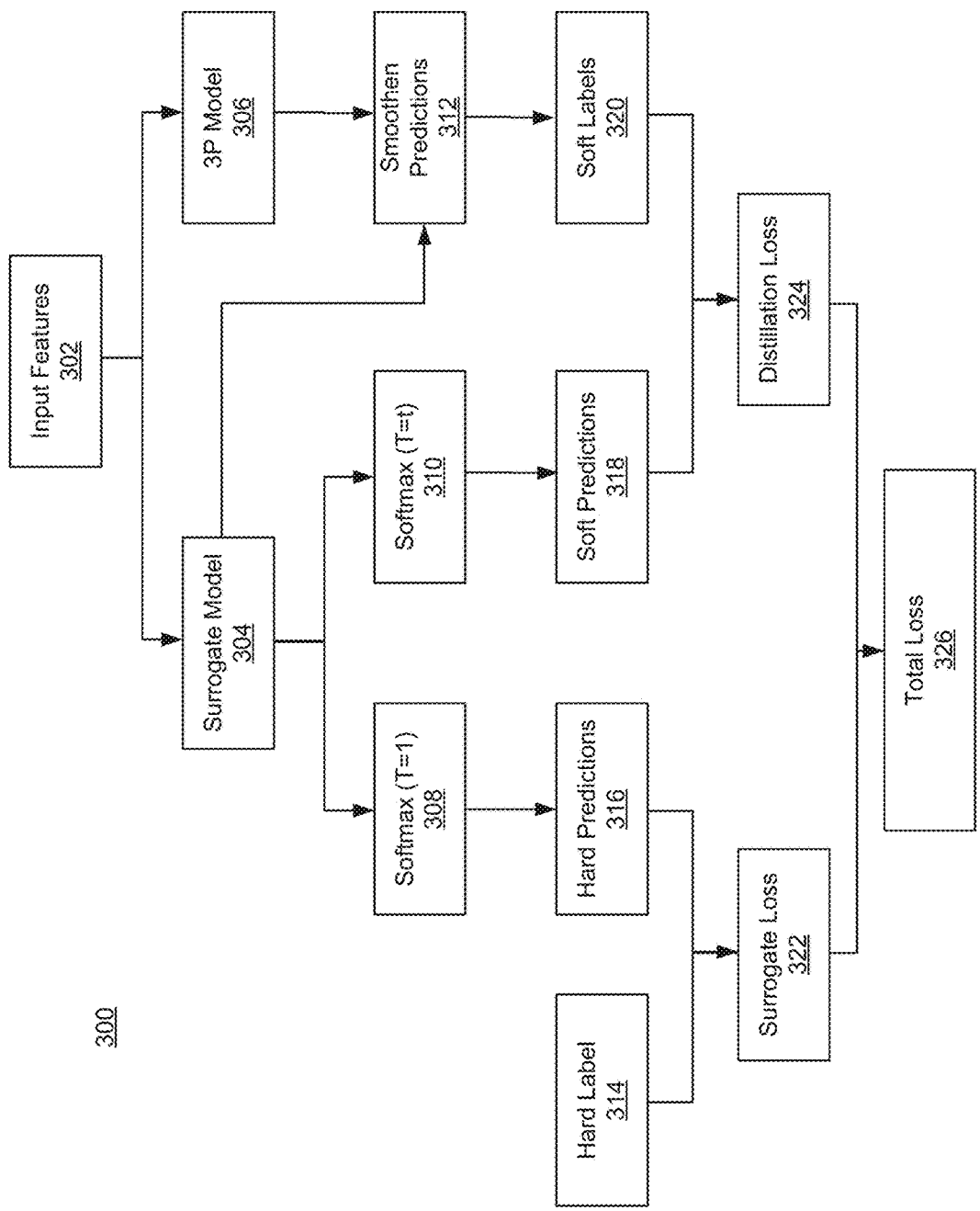
FIG. 3 depicts an example flow diagram of a process for training a model using knowledge distillation, in accordance with an implementation.
Figure 4:
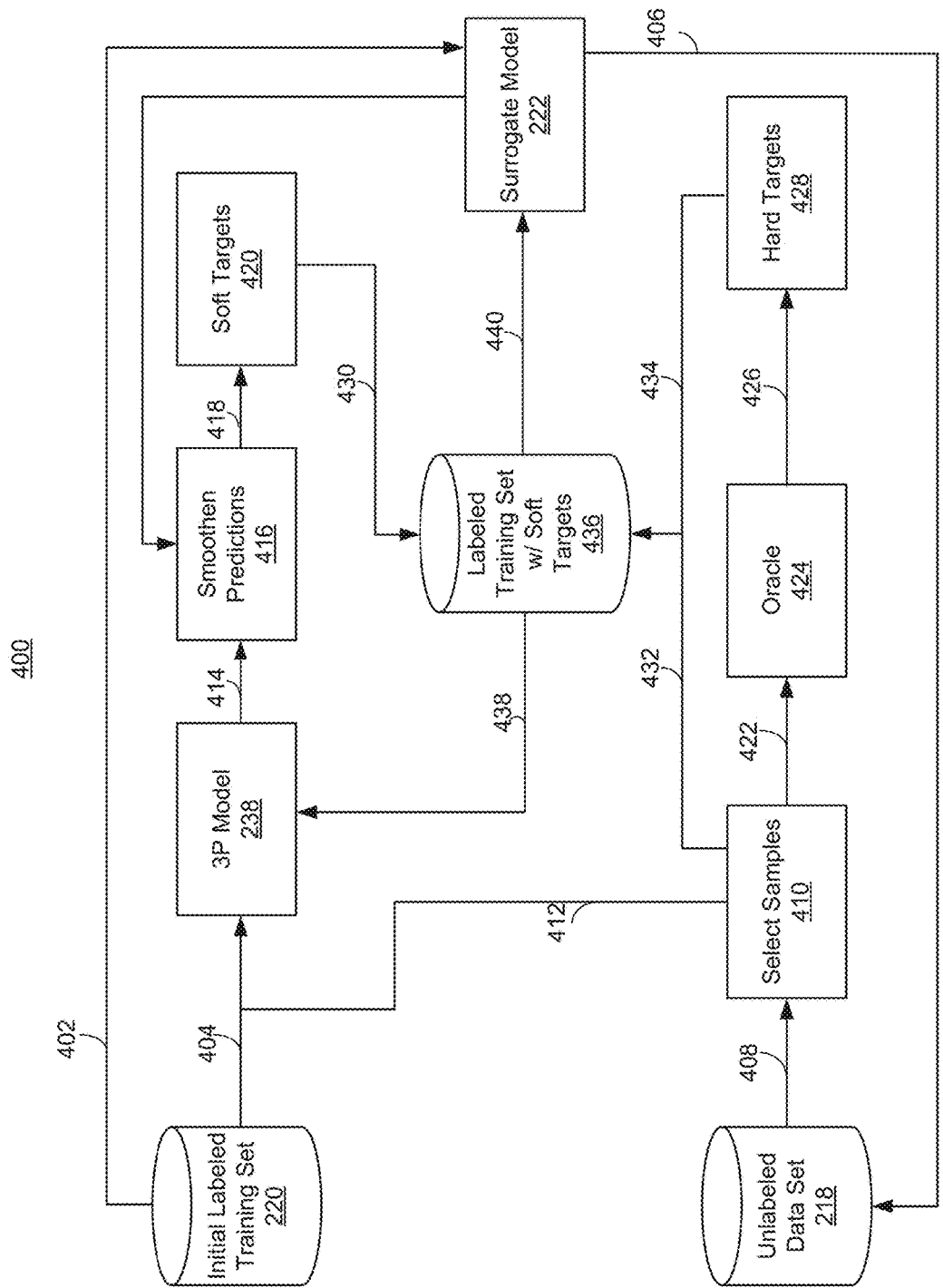
FIG. 4 depicts an example operational diagram of a system for training a model with active learning via a surrogate machine learning model using knowledge distillation, in accordance with an implementation.

The data processing system 202 can include a surrogate model generator 208 designed, constructed and operational to generate, maintain, train or otherwise provide a surrogate model 222. The surrogate model 222 can correspond to a 3P model 238 maintained by a 3P system 228. The surrogate model 222 can be different than the 3P model 238. For example, the surrogate model 222 can be a student model and the 3P model 238 can be a teacher model. The surrogate model 222 can be a subset of the 3P model 238 in some aspects. The surrogate model 222 can provide additional outputs relative to the 3P model 238, for example. The surrogate model generator 208 can generate the surrogate model 222 as depicted in FIG. 3 or FIG. 4.

The surrogate model 222 can refer to ML model that is configured to mimic the behavior of the 3P ML model 238 as closely as possible. The exact, inner workings of the 3P model 238 model may be hidden. However, the surrogate model generator 208 can have access to the input-output behavior of the 3P model 238. For example, the data processing system 202 may not have access to exactly how the 3P model 238 is trained (e.g., what functions are used) by the 3P model generator 230, but the surrogate model generator 208 can determine that the 3P model 238, given certain inputs (e.g., phrases) should predict certain categories (e.g., intents or functions). Based on this information, the surrogate model generator 208 can train a surrogate model 222 to learn this relationship between input phrases and intents (or functions). As the surrogate model 222 is maintained by the data processing system 202, the surrogate model 222 can be configured to provide more information relative to what is provided by the 3P model 238. For example, the surrogate model 222 can be configured to provide the probabilities for each intent, thereby allowing the query generator 206 to use uncertainty sampling active learning techniques or query-by-committee techniques to select data samples from the unlabeled data set 218 for active learning.

To do so, the surrogate model generator 208 can obtain an initial set of labeled data 220. The surrogate model generator 208 can initially train the surrogate model 222 using the initial set of labeled data 220. The data processing system 202 (e.g., via 3P model controller 210) can also provide the initial labeled 220 to the 3P model generator 230 to train the 3P model 238. The labeled data set 220 can include phrases configured for input into the virtual assistant and indications of corresponding functions to be executed by the one or more virtual applications. The surrogate model generator 208 can train the surrogate model 222 with the labeled data set 220.

The surrogate model generator 208 can continue to train the surrogate model 222 to better emulate aspects of the 3P model 238 trained by the 3P model generator 230. The surrogate model generator 208 can receive output from the 3P system 228 (e.g., via 3P model controller 210). The surrogate model generator 208 can receive the output from the 3P model 238 to tune, improve or otherwise train the surrogate model 222 to better emulate or match aspects of the 3P model 238.

To better emulate or match aspects of the 3P model 238, the surrogate model generator 208 can use knowledge distillation. The data processing system 202 can use knowledge distillation to improve active learning by generating a surrogate model 222 that provides additional information used by the query generator 206 to select data samples from the unlabeled data 218 set. The surrogate model generator 208 can train the surrogate model 222 to learn a representation of the input data that is closer to the actual $3^{rd}$ party model 238 than what is feasible by using just the raw data itself. This increased parity between the two models can allow the surrogate model 222 to better emulate the 3P model 238 model's outputs, thus leading to selecting better unlabeled samples during the active learning process.

The surrogate model generator 208 can perform knowledge distillation by transferring knowledge from the 3P model 238 to the surrogate model 222. For example, the surrogate model generator 208 can transfer the knowledge learned by a large model, such as the 3P model 238, to a smaller model, such as the surrogate model 222, which may not be able to easily obtain this knowledge directly from the data itself.

The surrogate model generator 208, using knowledge distillation, can train the surrogate model 222 to mimic the pre-trained, larger 3P model 238. For example, smaller models such as the surrogate model 222 may have worse generalization capabilities relative to the 3P model 238 because of the surrogate model 222 may have inferior expressive power compared to the larger 3P model 238. Thus, knowledge distillation allows for 'compressing' the larger 3P model's knowledge into the smaller surrogate model 222 with minimal loss in performance. The smaller surrogate model 222 can be smaller (e.g., consume or utilize less memory), faster (due to reduced size) and more energy efficient (e.g., be able to run on mobile devices). In some cases, the surrogate model generator 208 can transfer knowledge from an ensemble of models (e.g., a group of 3P models 238) to train a single smaller surrogate model 222. In some cases, the surrogate model generator 208, using knowledge distillation, can transfer knowledge from one modality (e.g., a model using RGB images) to another modality (e.g., a model using HSV color model), thereby allowing the surrogate model 222 to leverage the experience of the 3P model 238 despite using a different data input type.

To transfer or distill knowledge from the 3P model 238 to the surrogate model 222, the surrogate model generator 208 can obtain probabilities the 3P model 238 assigns to outputs. When the 3P model 238 correctly predicts a class, the 3P model 238 can assign a large value to the output variable corresponding to such class, and smaller values to the other output variables. The distribution of values among the outputs of the 3P model 238 for a data sample can provide information on how the 3P model generalizes. To transfer knowledge from the 3P model 238 to the surrogate model 222, the surrogate model generator 208 can distil such ability into the surrogate model 222 by training the surrogate model 222 to learn the soft output of the 3P model 238. Soft outputs can include the distribution of values of the other output variables.

For example, the 3P model 238 can predict that a given data sample (e.g., an image) is a first category with a 60% confidence score, and a second category with a 40% confidence score. The surrogate model generator 208 can use this information to train the surrogate model 222 to replicate the 3P model 238 as it will allow the model 222 to generalize better. For example, the data processing system 202 can provide a first set of phrases selected from the plurality of phrases in the unlabeled data set to the third-party system 228. The data processing system 202 can receive, from the 3P system 228, soft targets for the first of phrases output by the third-party model 238. The soft targets can include predictions for functions responsive to the first set of phrases. The predictions can include a category or class for a phrase. The predictions can include a probability of the phrase corresponding to the class. The probability can refer to or include a confidence score.

In distillation, the surrogate model generator 208 can transfer knowledge from the 3P model 238 to the surrogate model 222 by minimizing a loss function in which the target is the distribution of class probabilities predicted by the 3P model 238. However, in some cases, this probability distribution can have the correct class at a very high probability, with all other class probabilities very close to 0. As such, it doesn't provide much information beyond the ground truth labels already provided in the dataset. To address this technical problem, the surrogate model generator 208 can be configured to use a smoothing technique 224, such as a softmax temperature. The surrogate model generator 208 can retrieve the smoothing technique 224 from data repository 216. For example, the probability pi of class i can be determined from the logits z using the following smoothing technique 224 indicated by Function 1:

$$p_i = e^{\frac{z_i}{T}} / \sum_j e^{\frac{z_j}{T}},$$ [Function 1]

where T is the temperature parameter. When T=1, the result is the a standard softmax function. As T grows, the probability distribution generated by the softmax function becomes softer, providing more information as to which classes the 3P model 238 found more similar to the predicted class. This additional hidden knowledge from the 3P model 238 can be transferred to the surrogate model 222 in the distillation process. The surrogate model generator 208, when computing the loss function versus the 3P model's 238 soft targets, can use the same value of T to compute the softmax on the surrogate model 222 logits.

The surrogate model generator 208 can train the surrogate model 222, which can be referred to as a distilled model, to produce the correct labels based on the ground-truth (e.g., hard labels or targets) in addition to the soft labels (e.g., distributions for other output variables). To do so, the surrogate model generator 208 can determine the standard loss between the surrogate model's 222 predicted class probabilities and the ground-truth labels. This loss can be referred to as the surrogate loss. The surrogate model generator 208 can generate the overall loss function with a weighted average between the surrogate loss and the distillation loss. FIG. 3 depicts an example process or technique used by the surrogate model generator 208 for determining the total loss between the surrogate loss and the distillation loss.

The surrogate model generator 208 can use the softmax temperature as a smoothing technique 224 to smoothen the output probabilities of the surrogate model 222. In some cases, the 3P system 228 may not provide may not provide the output probabilities of each of the output classes from the 3P model 238, making it technically challenging to apply the smoothing technique. The surrogate model generator 208 of this technical solution can use probability clipping and probability assignment to address the missing output probabilities.

For example, the surrogate model generator 208 can use probability clipping when the top class output or predicted by the 3P model 238 has a probability or confidence score that is above a clipping threshold (or threshold). The clipping threshold can be stored in thresholds 226 data structure. The surrogate model generator 208 can access the data repository 216 to retrieve the clipping threshold from the thresholds 226 data structure. The clipping threshold can be 0.9, 0.91, 0.92, 0.93, 0.94, 0.95, 0.96, or other threshold that facilitates probability clipping for a smoothing technique. The surrogate model generator 208 can clip the output probability to the threshold. By clipping the output to the threshold, the surrogate model generator 208 can avoid technical problems that arise when the 3P model 238 may constantly return very high probabilities (or confidence scores) for the top class. This helps in case the $3^{rd}$ party model returns constantly very high probabilities such as 1 or 100%.

The surrogate model generator 208 can assign a probability to the remaining classes as part of the smoothing technique. In some cases, the surrogate model generator 208 can apply a remaining probability (e.g., 0.5, 0.4, 0.6, 0.7, etc.) uniformly to the other classes. In some cases, the surrogate model generator 208 can use estimates of the surrogate model 222 to guide the assignment of the remaining probability. Thus, the surrogate model generator 208 can assign the remaining probability proportionally to the surrogate model's 222 predictions for each class.

The surrogate model generator 208 can apply the softmax temperature function. The surrogate model generator 208 can apply the softmax temperature function after probability clipping and probability assignment. The surrogate model generator 208 can apply the softmax temperature function to the logits. The surrogate model generator 208 can determine the logits by taking a natural logarithm of each class probability. The natural logarithm of each class probability can correspond to or be equal to the inverse of the softmax function, for example. FIG. 3 depicts an example process or technique used by the surrogate model generator 208 for applying the softmax function.

Thus, the surrogate model generator 208 can adjust the soft targets using a smoothing technique that includes at least one of probability clipping, a probability assignment, or a softmax temperature. The surrogate model generator 208 can train the surrogate model based on the adjusted soft targets and the indications of functions received via the user interface.

Using the smoothing techniques, the surrogate model generator 208 can generate the surrogate model 222 to mimic or emulate aspects of the 3P model 238 using knowledge distillation. The surrogate model generator 208 can determine soft labels or targets for some of the data samples prior to training the surrogate model 222 in order to perform knowledge distillation, and can use an initial labelled data set 220 that trains the 3P model 238 to do so. This initial $3^{rd}$ party model 238 can be used for determining the soft targets of some future data samples. In some cases, the data processing system 202 can discard this initial labeled data set 220 used to train the 3P model 238 so as not to cause the 3P model 238 to provide predictions based on data the 3P model 238 was already trained on. Prior to training the surrogate model 222, the data processing system 202 can use a random sampling query strategy in order to select unlabeled data samples to initially train the surrogate model 222.

As the 3P model 238 improves through repeating training, the 3P model's 238 predictions on new unseen data samples become more accurate and the soft targets from the 3P model 238 become more informative, which can improve the performance of the surrogate model 222 and the active learning cycle. To take advantage of the improving performance of the surrogate model 238, the data processing system 202 of this technical solution can perform a cross validation to obtain fresh, updated soft targets at an interval. For example, at regular time intervals of the active learning process (e.g. every 5, 10, 15, 20, etc. active learning iterations), the data processing system 202 can update the soft targets for all data samples labelled so far using a cross-validation process. For example, if there are 100 labelled data samples stored in the labelled data set 220, the data processing system 202 can use 80 of the labeled data samples to train the $3^{rd}$ party model 238 and then use the 3P model 238 to predict the labels (and soft targets) for the remaining 20 samples. The data processing system 202 can then select another 80 out of the 100 samples (this time including the above 20 samples) and repeat the process until the data processing system 202 has updated soft targets for all 100 data samples. This process allows the data processing system 202 to incorporate the 'discarded' initial data in subsequent active learning iterations and keeps the soft targets updated as the process goes on.

The data processing system 202 can include a query generator 206 designed, constructed and operational to query the unlabeled data set 218 to select one or more unlabeled data samples. The query generator 206 can query the unlabeled data set 218 to select a first set of samples (e.g., a first set of phrases) from the unlabeled data samples stored in the unlabeled data set 218. The query generator 206 can input the unlabeled data set 218 into the surrogate model 222 trained with the labeled data set 220 or knowledge distillation from the 3P model 238 to generate the predictions, along with probabilities or confidence scores, for the unlabeled data set. In some cases, the predictions can include a category or class and a corresponding probability or confidence score. The query generator 206 can select the first set of samples based at least on one or more confidence scores output by a surrogate model 222 that corresponds to a third-party model 238 maintained by a third-party system 228. The data processing system 202 can generate a prompt with a request for an oracle (e.g., a user of the data processing system 202) to annotate or label the unlabeled data set. For example, the data processing system 202 can provide the prompt via a user interface of the client computing device 234. The data processing system 202 can receive, via the user interface, an annotation or label for the selected first set of data samples. For example, the annotations or labels can include indications of functions to be executed by the one or more virtual applications responsive to the selected first set of phrases.

The query generator 206 can use or be configured with one or more query strategies to select data samples from the unlabeled data set 218. The query generator 206 can construct a query to select a set of phrases based on at least one of an uncertainty sampling technique or a query-by-committee technique, for example.

The query generator 206 can be configured with one or more types of uncertainty sampling techniques including, for example, a least confident technique, a margin sampling technique, or an entropy sampling technique. With the least confident uncertainty sampling technique, the query generator 206 can query instances or data samples in the unlabeled data set 218 about which the surrogate model 222 is least certain how to label. This approach can be configured for probabilistic learning models. For example, when using a probabilistic model for binary classification, the query generator 206 using the least confident uncertainty sampling technique can query the instance whose posterior probability of being positive is nearest to 0.5.

With the margin sampling uncertainty sampling technique, the query generator 206 can select the instances in the unlabeled data set 218 where the difference between the first most likely and second most likely classes are the smallest. The margin sampling technique can correct for a shortcoming in the least confident technique by incorporating the posterior of the second most likely label. For instances with small margins, knowing the true label can facilitate the model discriminating more effectively between them.

With the entropy sampling uncertainty technique, the query generator 206 can select the instances where the class probabilities have the largest entropy. Entropy can be an information-theoretic measure that represents the amount of information used to "encode" a distribution. As such, it is often thought of as a measure of uncertainty or impurity in machine learning.

The query generator 206 can use one or more of the uncertainty sampling techniques. The query generator 206 can select an uncertainty sampling technique to use based on one or more factors or criteria. For example, the query generator 206 can use the entropy sampling technique if the objective function is to minimize log-loss, while the query generator 206 can select least confident or margin sampling in order to reduce classification error.

The query generator 206 can use a query-by-committee ("QBC") technique. With QBC, the query generator 206 can obtain multiple hypotheses (e.g., trained classifiers) about the unlabeled dat. The query generator 206 can then select the query by identifying the hypothesis with which the multiple hypotheses most disagree. The QBC technique can leverage one or more of vote entropy sampling, KL max disagreement, or consensus entropy sampling.

For example, with vote entropy sampling QBC, the query generator 206 can determine the vote entropy for the committee by determining the predictions of the data samples for each learner in the committee, and then determining the probability distribution of the votes. The entropy of this distribution is the vote entropy of the committee.

The query generator 206 can use a Kullback-Leibler ("KL") max disagreement QBC technique. KL divergence, which can be referred to as relative entropy, can be a measure of how one probability distribution is different from a second, reference probability distribution. The query generator 206 can determine the max disagreement for the committee by determining the class probabilities of a data sample for each learner in the committee, and then determining the consensus probability distribution by averaging the individual class probabilities for each learner. The query generator 206 can compare the class probabilities of each learner to the consensus distribution as in KL divergence.

The query generator 206 can determine the max disagreement for a given sample as the argmax of the KL divergences of the learners from the consensus probability. The query generator 206 can select the most informative query to be the one with the largest average difference between the label distributions of any one committee member and the consensus.

The query generator 206 can use a consensus entropy sampling QBC. The query generator 206 can determine the consensus entropy for the committee by determining the class probabilities of a data sample for each learner in the committee, and then determining the consensus probability distribution by averaging the individual class probabilities for each learner. The query generator 206 can determine the entropy of the consensus probability distribution as the vote entropy of the committee.

Upon selecting one or more data samples from the unlabeled data set 218 using one or more query strategies, the data processing system 202 can provide a prompt for input. The input can refer to ground-truth. The input can include an annotation or label. The input can be used to perform active learning. The data processing system 202 can present the input via a user interface, and receive the input via an interface.

Upon receiving the input label or annotation for the selected unlabeled data samples, the data processing system 202 can provide the received labels or annotations to the 3P system 228. The data processing system 202 can include a 3P model controller 210 designed, constructed and operational to interface with the 3P system 228. The 3P model controller 210 can transmit the received annotations or labels to the 3P system 228 to cause the 3P model generator 230 to train the 3P model 238. For example, the data processing system 202 can select, using the querying strategy, a first set of phrases from the unlabeled data set 218. The data processing system 202 can request input from an oracle or user for labels. The data processing system 202 can receive indications of functions for the selected first set of phrases. The indications of functions can be referred to as the annotations or labels. The 3P model controller 210 can provide the indications of functions for the selected first set of phrases to the 3P system 228 to cause the 3P model generator 230 to train the third-party model 238. By training the 3P model 238, the 3P ML-based service 232 can perform a function. For example, the 3P ML-based service 232 can include a virtual assistant configured to use the 3P model 238 to execute a function responsive to a phrase in the first set of phrases.

The data processing system 202 can continue to query the unlabeled data set 218 to perform active learning until a condition is met. For example, the condition can be a number of iterations or queries, until the unlabeled data set 218 is empty (e.g., after labeling a data sample, it is removed from the unlabeled data set 218 and moved to the labeled data set 220), or based on a level of performance of the surrogate model 222 or the 3P model 238.

The data processing system 202 (e.g., via the 3P model controller 210), can determine a level of performance of the 3P ML-based service 232 in performing a task or function. If the level of performance is less than or equal to a threshold (e.g., a performance threshold stored in threshold data structure 226), then the data processing system 202 can determine to continue performing active learning in order to generate labeled data 220 used to train or improve the performance of the 3P model 238. However, if the performance of the 3P ML-based service 232 is greater than the performance threshold, then the data processing system 202 can determine that the active learning process is complete.

In some cases, the data processing system 202 can determine the active learning process is complete if the incremental change in the level of performance is less than a second threshold. For example, the data processing system 202 can determine a change in the level of performance of the 3P ML-based service 232 in performing the task or function. If the change in the level of performance, or the improvement in the level of performance, is very small, negligible, or less than a second threshold, then the data processing system 202 can determine that active learning is complete. For example, the data processing system 202 can determine it may not be worth the computing and memory resources to continue active learning due to the small amount of improvement. The data processing system 202 can prevent the selection of subsequent sets of data samples from the unlabeled data structure 218 responsive to determining that the incremental improvement in performance is not worthwhile.

For example, the data processing system 202 can determine the performance of a virtual assistant in causing the one or more virtual applications to execute the one or more functions responsive to input phrases. If the level of performance is less than or equal to a threshold, then the data processing system 202 can select a second set of phrases from the plurality of phrases in the unlabeled data set 218 to receive second indications of functions for provision to the third-party system to train the third-party model.

FIG. 3 depicts an example flow diagram of a process for training a model using knowledge distillation, in accordance with an implementation. The process 300 can be performed by one or more component or system depicted in FIG. 1A, 1B or 2, including, for example, a data processing system. At ACT 302, the data processing system can receive input features, such as data samples from a labeled data set or data samples from an unlabeled data set. The data processing system can provide the data samples to a 3P model as well as a surrogate model. At ACT 306, the 3P model can receive the data samples and provide an output. At ACT 304, the surrogate model can receive the data samples and provide an output.

The data processing system can apply a softmax function at ACTs 308 and 310. At ACT 308, the softmax function (e.g., Function 1) can have T=1. At ACT 310, the softmax function can have T=t such that as T grows, the probability distribution generated by the softmax function becomes softer, thereby providing greater information as to which classes the 3P model found more similar to the predicted class.

Using T=1, the data processing system can provide the hard predictions at 316. Using T=t, the data processing system can provide the soft predictions at ACT 318. At Act 314, the data processing system can receive hard labels, such as from an oracle. The hard labels can refer to ground-truth information provided by an oracle, such as a user of the data processing system. At ACT 322, the data processing system can determine a surrogate loss based on the hard labels 314 and the hard predictions 316.

At ACT 312, the data processing system can smoothen the predictions output from the 3P model 306. The data processing system can smoothen the predictions using probability clipping or probability assignment, for example. At ACT 320, the data processing system can provide soft labels that are output from the 3P model 306 and smoothened using a smoothing technique at ACT 312. The data processing system can compare the soft predictions 318 from setting softmax T=t with the soft labels 320 to determine a distillation loss at ACT 324.

At ACT 326, the data processing system can determine a total loss by aggregating the surrogate loss from ACT 322 with the distillation loss from ACT 324. The total loss can be determined based on Function 2 as follows:

$$\text{total\_loss} = a * \text{surrogate\_loss} + (1-a) * \text{distillation\_loss},\quad \text{[Function 2]}.$$

The total loss determined via Function 2 at ACT 326 can be a weighted average between the surrogate loss and the distillation loss, where the surrogate loss can be weighted with a value "a" and the distillation loss can be weighted with a value (1−a).

FIG. 4 depicts an example operational diagram of a system for training a model with active learning via a surrogate machine learning model using knowledge distillation, in accordance with an implementation. The process 400 can be performed by one or more component or system depicted in FIG. 1A, 1B or 2, including, for example, a data processing system. The data processing system can access a database storing an initial labeled training set 220. At ACT 402, the data processing system can provide the initial labeled training set to a surrogate model 222 maintained by the data processing system. At ACT 404, the data processing system can provide the same initial labeled training set to a 3P model 238 maintained by a 3P system 228. At ACT 402, knowledge distillation may not yet be possible because soft labels for the initial labelled training set have not yet been provided by the 3P model 238.

At ACT 406, the surrogate model 222 can make predictions on the unlabeled data set 218. The data processing system can use the surrogate model 222 to make a predictions on the unlabeled data set 218. The prediction can include classes for data samples along with a probability or confidence score of the data sample corresponding to the class. At ACT 408, the data processing system can use a querying strategy to select samples 410 from the unlabeled data set 218. The data processing system can select the samples 410 based on the predictions output from the surrogate model 222 and the querying strategy.

At Act 412, the data processing system can provide the selected samples 410 to the 3P model 238. The 3P model 238 can provide or output predictions for the selected samples at ACT 414. At ACT 416, the data processing system can receive the predictions for the selected samples from the 3P model 238, and then smoothen the predictions. The data processing system can smoothen the predictions using probability clipping, probability assignment and softmax temperature. At ACT 416, the data processing system can take the smoothened predictions to generate soft targets 420. The data processing system can generate soft targets 420 from the smoothened predictions 416 at ACT 418. The soft targets 420 can be the smoothened predictions.

At ACT 422, the data processing system can output the selected samples 410 to an oracle 424. The oracle 424 can refer to a user of the data processing system or other data source that can provide hard targets or ground-truth data for the selected samples. The oracle 424 can facilitate an active learning process. At ACT 426, the data processing system can identify the hard targets 428. For example, the data processing system can receive the hard targets 428 from a user interface or other data source.

At ACT 430, the data processing system can store the soft targets 420 in a database 436 containing the labeled training set. At ACT 432, the data processing system can provide the selected samples 410 to the database 436. At ACT 434, the data processing system can provide the hard targets 428 to the database 436. The data processing system can add the selected samples 410, hard targets 426, and soft targets 420 to the labeled data set 436.

At ACT 438, the data processing system can provide the labeled data set 436 to the 3P model 238 to cause the 3P system 228 to update the 3P model 238. At ACT 440, the data processing system can also use the labeled data set 436 to update the surrogate model 222 using knowledge distillation such that the surrogate model 222 can mimic aspects of the 3P model 238. The data processing system can repeat ACTs 406-440 until an acceptable performance has been achieved for the 3P model 238, there is no unlabeled data remaining, or the incremental performance improvements are very small, such as below a threshold.

Figure 5:
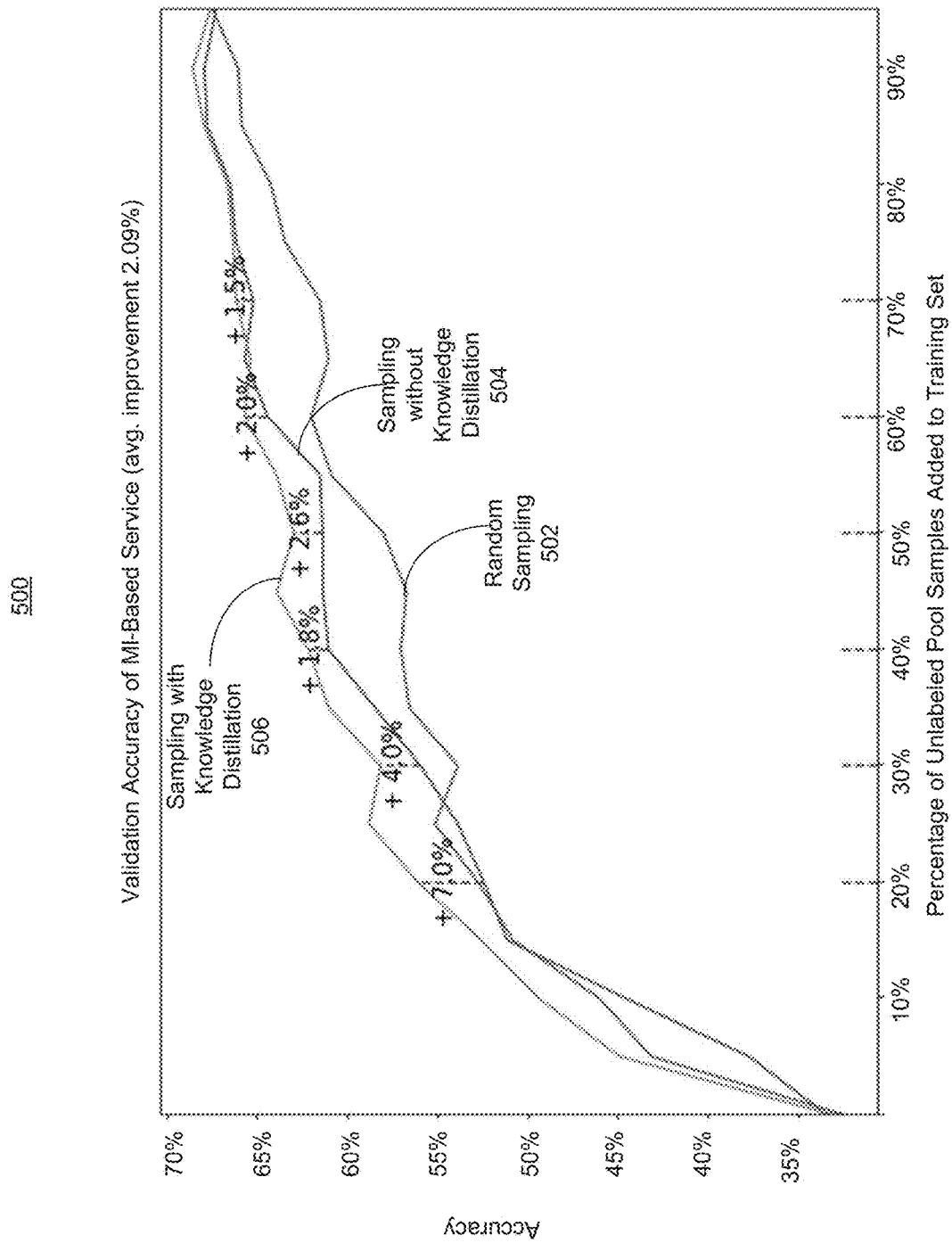
FIG. 5 depicts a graph illustrating an improvement in performance resulting from active learning via a surrogate machine learning model using knowledge distillation.

FIG. 5 depicts a graph illustrating an improvement in performance resulting from active learning via a surrogate machine learning model using knowledge distillation. The graph 500 can correspond to the performance of the 3P model being trained or updated using active learning via a surrogate model that is updated using knowledge distillation. The graph 500 depicts the accuracy in the vertical y-axis as a percentage. The graph depicts a percentage of unlabeled pool samples added to the training set in the x-axis. For example, the unlabeled data set 218 can have 1000 data samples, and active learning can be used to label the data samples and add them to the labeled data set 220, which can be referred to as the training set used to update the 3P model 238.

Graph 500 depicts the performance using random sampling 502, sampling without knowledge distillation 504, and sampling with knowledge distillation 506. Random sampling can refer to the query generator randomly selecting samples from the unlabeled data 218 to provide to an oracle for active learning. Sampling without knowledge distillation 504 can refer to not updating the surrogate model using knowledge distillation so that the surrogate model mimics the 3P model, and then using a querying strategy to select samples from the unlabeled data set. Sampling with knowledge distillation 506 can refer to updating the surrogate model using knowledge distillation so that the surrogate model mimics the 3P model, and then using a querying strategy to select samples from the unlabeled data set.

As indicated by graph 506, sampling using knowledge distillation can provide the best performance (e.g., accuracy) with the least amount of active learning (e.g., lowest percentage of unlabeled pool samples added to training set). Thus, this technical solution can provide a significant increase in performance for the same resources utilization, or match the performance while reducing resource utilization. For example, by adding 20% of the unlabeled data set to the labeled data set, this technical solution 506 can provide a 7% increase in performance relative to random sampling 502 or sampling without knowledge distillation 504. By adding 30% of the unlabeled data set to the labeled data set, this technical solution 506 can provide a 4% increase in performance relative to random sampling 502 or sampling without knowledge distillation 504.

The data processing system can use graph 500 to determine whether active learning is complete based on the level of performance of the 3P model. For example, if the accuracy of the 3P model is greater than a threshold, such as 55%, 60%, 65%, or other threshold, the data processing system can determine that active learning is complete. In another example, the data processing system can determine that active learning is complete based on a percentage of unlabeled data samples added to the training set being greater than a threshold (e.g., 50%, 60%, 70%, etc.). In yet another example, the data processing system can determine that active learning is complete when the incremental increase in accuracy as additional unlabeled data samples are added to the training set is less than a threshold. For example, the accuracy can be 60% when 40% of the unlabeled data samples are added to the training set, and the accuracy can be 64% when 50% of the data samples are added to the training set. The data processing system can determine that an increase in accuracy of 4% when 10% more samples are added to the training set indicates that the training set is satisfactory. For example, the increase in accuracy relative to the increase in data samples in the training set may be below a threshold ratio (e.g., accuracy/samples). The accuracy vs samples threshold can 1, 0.9, 0.8, 0.7, 0.6, 0.5, etc. In this example, the accuracy/percentage samples is 0.4, which can be less than a threshold of 0.5, thereby indicating that active learning is complete.

Figure 6:
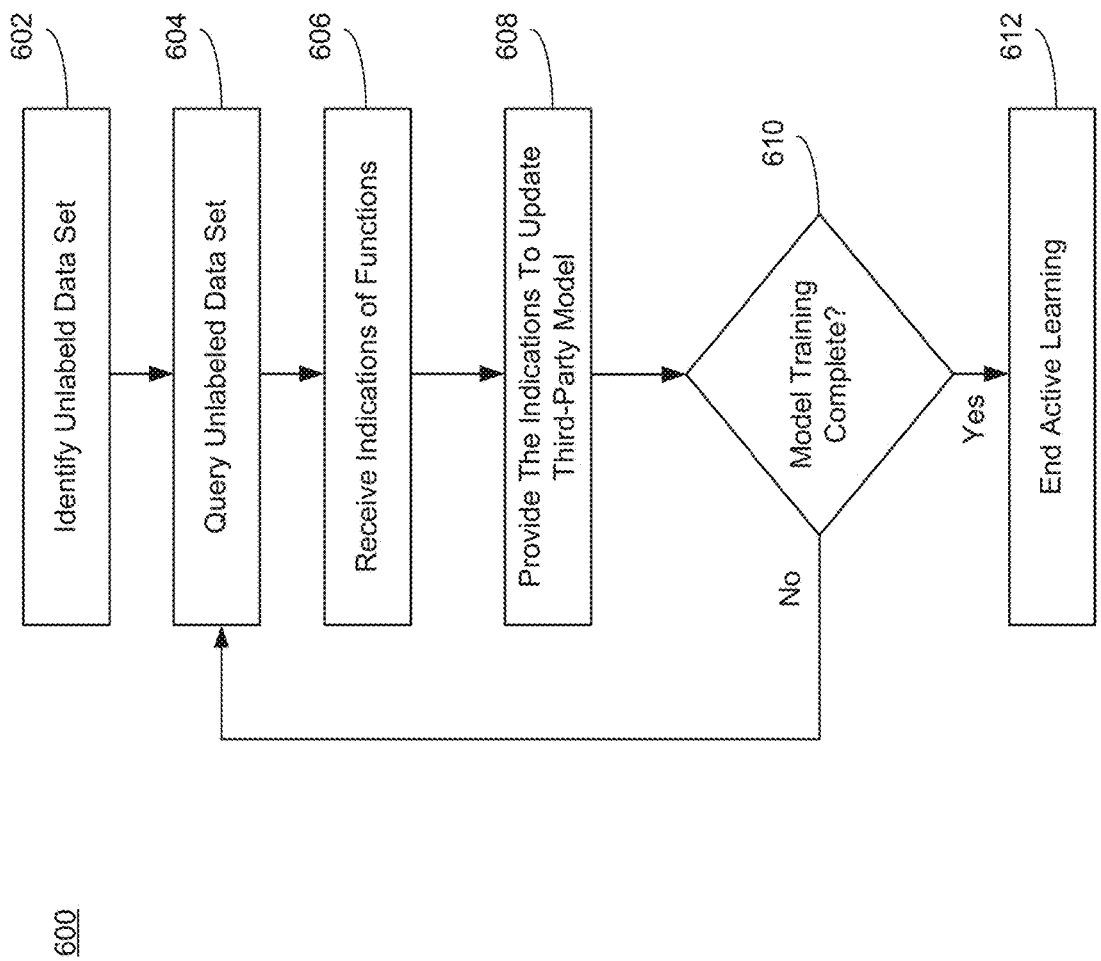
FIG. 6 depicts an example flow diagram of a method for training a model, in accordance with an implementation.

FIG. 6 depicts an example flow diagram of a method for training a model, in accordance with an implementation. The method 600 can be performed by one or more component or system depicted in FIG. 1A, 1B or 2, including, for example, a data processing system. In brief overview, the data processing system can identify an unlabeled data set at ACT 602. At ACT 604, the data processing system can query the unlabeled data set. At ACT 606, the data processing system can receive indications of functions. At ACT 608, the data processing system can provide the indication to a 3P system to train a 3P model. At decision block 610, the data processing system can determine whether the training or active learning is complete. If the active learning is not complete, the data processing system can return to ACT 604. If the active learning is complete, the data processing system can proceed to 612 to end active learning.

Still referring to FIG. 6, and in further the detail, the data processing system can identify an unlabeled data set at ACT 602. The data processing system can identify a pool of unlabeled data. The pool of unlabeled data can include inputs such as phrases, images, text, objects, or any other data samples that are to be classified by a machine learning model. For example, the data processing system can receive voice input or text input from users with requests to perform functions via virtual applications.

At ACT 604, the data processing system can query the unlabeled data set. The data processing system can use any query strategy to identify or select one or more samples from the unlabeled data set. In the event a surrogate model has not yet been trained or generated, the data processing system can initially use a random sampling technique to select samples from the unlabeled data set. If a surrogate model has been initially trained using an initial labeled data set, the data processing system can input the entire unlabeled data set into the surrogate model to obtain soft labels indicating predictions for classes for the data samples, and then use a querying strategy to select a subset of data samples. For example, the data processing system can select the data samples for which the surrogate model outputs classes with the least amount of confidence or lowest probability.

ACT 606, the data processing system can receive indications of functions. The data processing system can generate a prompt with the selected unlabeled data samples to provide to an oracle to request hard targets. In some cases, the data processing system can access another data source containing hard targets or ground-truth for the selected unlabeled data samples. The data processing system can receive input from a user, for example, that indicates the labels or classes, such as functions, that correspond to the data samples or phrases.

ACT 608, the data processing system can provide the indication to a 3P system to train a 3P model. The data processing system can provide the hard targets or ground-truth received from the oracle to the 3P system to cause the 3P system to update or train the 3P model. For example, the 3P model may have been initially trained using the initial labeled data set, but the 3P system can now update the 3P model using active learning.

At decision block 610, the data processing system can determine whether the training or active learning is complete. The data processing system can determine whether active learning is complete based on a performance of the 3P model, the unlabeled data set being empty, or the incremental increase in performance of the 3P model being very small or less than a threshold. For example, graph 500 depicted in FIG. 5 illustrates an example accuracy (or performance) of the 3P model in relation to the percentage of unlabeled data samples added to the training set. If the accuracy is greater than a threshold, or the incremental improvement in accuracy is less than a threshold, then the data processing system can determine at decision block 610 that active learning is complete and proceed to ACT 612. However, if the data processing system determines that the accuracy is less than a threshold or that the incremental improvement in accuracy is greater than the threshold, then the data processing system can determine at decision block 610 that active learning is not complete and return to ACT 604 to query the unlabeled data set to select additional unlabeled data samples to add to the training set. In some cases, the data processing system can determine that active learning is complete when one or more conditions are met.

If the active learning is complete, the data processing system can proceed to 612 to end active learning. The data processing system can determine that the 3P model performance in a satisfactory manner and that it may not be necessary to further update the 3P model based on a training set.

The data processing system can determine to perform active learning again after completing active learning at ACT 612. For example, the data processing system can monitor the unlabeled data set to determine that additional unlabeled data samples have been collected. This can trigger the data processing system to return to ACT 602. In another example, the data processing system can monitor the performance of the 3P model. If the performance of the 3P model falls below a threshold, the data processing system can return to ACT 602 or 604 to perform additional active learning.

The above-mentioned elements or entities may be implemented in hardware, or a combination of hardware and software, in one or more embodiments. Components may be implemented using hardware or a combination of hardware or software detailed above in connection with FIGS. 1A-1B. For instance, these elements or entities can include any application, program, library, script, task, service, process or any type and form of executable instructions executing on hardware of a device. The hardware includes circuitry such as one or more processors in one or more embodiments.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

It will be further understood that various changes in the details, materials, and arrangements of the parts that have been described and illustrated herein may be made by those skilled in the art without departing from the scope of the following claims.

What is claimed is:

1. A method of training a model for a Virtual assistant that interfaces with one or more virtual applications hosted on one or more servers, comprising:
   identifying, by one or more processors, an unlabeled data set comprising a plurality of phrases received by a virtual assistant that interfaces with one or more virtual applications to execute one or more functions;
   querying, by the one or more processors, the unlabeled data set to select a first set of phrases from the plurality of phrases based at least on one or more confidence scores output by a surrogate model that corresponds to a third-party model maintained by a third-party system;
   receiving, by the one or more processors via a user interface, indications of functions to be executed by the one or more virtual applications responsive to the selected first set of phrases;
   providing, by the one or more processors to the third-party system, the indications of functions for the selected first set of phrases to train the third-party model and configure the virtual assistant to execute a function responsive to a phrase in the first set of phrases;
   determining, by the one or more processors, a level of performance of the virtual assistant in causing the one or more virtual applications to execute the one or more functions responsive to input phrases;
   selecting, by the one or more processors responsive to the level of performance being less than or equal to a threshold, a second set of phrases from the plurality of phrases in the unlabeled data set to receive second indications of functions for provision to the third-party system to train the third-party model;
   determining, by the one or more processors, a change in the level of performance of the virtual assistant in causing the one or more virtual applications to execute the one or more functions responsive to input phrases; and
   preventing, by the one or more processors responsive to the change in the level of performance being less than or equal to a second threshold, selection of a subsequent set of phrases from the unlabeled data set to complete a labeling process for the unlabeled data set.

2. The method of claim 1, comprising:
   providing, by the one or more processors, a labeled data set to the third-party system to train the third-party model, the labeled data set comprising phrases configured for input into the virtual assistant and indications of corresponding functions to be executed by the one or more virtual applications.

3. The method of claim 1, comprising:
   training, by the one or more processors, the surrogate model with a labeled data set, the labeled data set comprising phrases configured for input into the virtual assistant and indications of corresponding functions to be executed by the one or more virtual applications.

4. The method of claim 3, comprising:
   inputting, by the one or more processors, the unlabeled data set into the surrogate model trained with the labeled data set to generate the predictions for the unlabeled data set.

5. The method of claim 1, comprising:
   constructing, by the one or more processors, a query to select the first set of phrases based on at least one of an uncertainty sampling technique or a query-by-committee technique.

6. The method of claim 1, comprising:
providing, by the one or more processors, the first set of phrases selected from the plurality of phrases in the unlabeled data set to the third-party system; and
receiving, by the one or more processors, soft targets for the first of phrases output by the third-party model, the soft targets comprising predictions for functions responsive to the first set of phrases.

7. The method of claim 6, comprising:
adjusting, by the one or more processors, the soft targets using a smoothing technique comprising at least one of probability clipping, a probability assignment, or a softmax temperature; and
training, by the one or more processors, the surrogate model based on the adjusted soft targets and the indications of functions received Via the user interface.

8. The method of claim 1, comprising:
providing, by the one or more processors responsive to the selection of the first set of phrases, a prompt via the user interface for the indications of functions responsive to the first set of phrases.

9. A system to train a model for a virtual assistant that interfaces with one or more virtual applications hosted on one or more servers, comprising:
memory and one or more processors to:
identify an unlabeled data set comprising a plurality of phrases received by a virtual assistant that interfaces with one or more virtual applications to execute one or more functions;
query the unlabeled data set to select a first set of phrases from the plurality of phrases based at least on one or more confidence scores output by a surrogate model that corresponds to a third-party model maintained by a third-party system;
receive, via a user interface, indications of functions to be executed by the one or more virtual applications responsive to the selected first set of phrases;
provide, to the third-party system, the indications of functions for the selected first set of phrases to train the third-party model and configure the virtual assistant to execute a function responsive to a phrase in the first set of phrases;
determine a level of performance of the virtual assistant in causing the one or more virtual applications to execute the one or more functions responsive to input phrases;
select, in response to the level of performance being less than or equal to a threshold, a second set of phrases from the plurality of phrases in the unlabeled data set to receive second indications of functions for provision to the third-party system to train the third-party model;
determine a change in the level of performance of the virtual assistant in causing the one or more virtual applications to execute the one or more functions responsive to input phrases; and
prevent, in response to the change in the level of performance being less than or equal to a second threshold, selection of a subsequent set of phrases from the unlabeled data set to complete a labeling process for the unlabeled data set.

10. The system of claim 9, wherein the one or more processors are further configured to:
provide a labeled data set to the third-party system to train the third-party model, the labeled data set comprising phrases configured for input into the virtual assistant and indications of corresponding functions to be executed by the one or more virtual applications.

11. The system of claim 9, wherein the one or more processors are further configured to:
train the surrogate model with a labeled data set, the labeled data set comprising phrases configured for input into the virtual assistant and indications of corresponding functions to be executed by the one or more virtual applications.

12. The system of claim 11, wherein the one or more processors are further configured to:
input the unlabeled data set into the surrogate model trained with the labeled data set to generate the predictions for the unlabeled data set.

13. The system of claim 9, wherein the one or more processors are further configured to:
construct a query to select the first set of phrases based on at least one of an uncertainty sampling technique or a query-by-committee technique.

14. The system of claim 9, wherein the one or more processors are further configured to:
provide the first set of phrases selected from the plurality of phrases in the unlabeled data set to the third-party system; and
receive soft targets for the first of phrases output by the third-party model, the soft targets comprising predictions for functions responsive to the first set of phrases.

15. The system of claim 14, wherein the one or more processors are further configured to:
adjust the soft targets using a smoothing technique comprising at least one of probability clipping, a probability assignment, or a softmax temperature; and
train the surrogate model based on the adjusted soft targets and the indications of functions received via the user interface.

16. The system of claim 9, wherein the one or more processors are further configured to:
provide, responsive to the selection of the first set of phrases, a prompt via the user interface for the indications of functions responsive to the first set of phrases.

17. A non-transitory computer-readable medium comprising instructions that, when executed by one or more processors, train a model for a Virtual assistant that interfaces with one or more virtual applications hosted on one or more sewers, wherein the instructions comprise instructions to:
identify an unlabeled data set comprising a plurality of phrases received by a virtual assistant that interfaces with one or more Virtual applications to execute one or more functions;
query the unlabeled data set to select a first set of phrases from the plurality of phrases based at least on one or more confidence scores output by a surrogate model that corresponds to a third-party model maintained by a third-party system;
receive, via a user interface, indications of functions to be executed by the one or more virtual applications responsive to the selected first set of phrases;
provide, to the third-party system, the indications of functions for the selected first set of phrases to train the third-party model and configure the virtual assistant to execute a function responsive to a phrase in the first set of phrases;
determine a level of performance of the virtual assistant in causing the one or more virtual applications to execute the one or more functions responsive to input phrases;
selecting, in response to the level of performance being less than or equal to a threshold, a second set of phrases from the plurality of phrases in the unlabeled data set to receive second indications of functions for provision to the third-party system to train the third-party model;

determine a change in the level of performance of the virtual assistant in causing the one or more virtual applications to execute the one or more functions responsive to input phrases; and prevent, in response to the change in the level of performance being less than or equal to a second threshold, selection of a subsequent set of phrases from the unlabeled data set to complete a labeling process for the unlabeled data set.

18. The computer-readable medium of claim 17, wherein the instructions further comprise instructions to:

provide a labeled data set to the third-party system to train the third-party model, the labeled data set comprising phrases configured for input into the Virtual assistant and indications of corresponding functions to be executed by the one or more Virtual applications.

\* \* \* \* \*